United States Patent
Kim et al.

(10) Patent No.: US 7,254,121 B2
(45) Date of Patent: Aug. 7, 2007

(54) SYSTEM AND METHOD OF CONTROLLING ASSIGNMENT OF A CALL ON A REVERSE SUPPLEMENTAL CHANNEL IN A MOBILE COMMUNICATION SYSTEM

(75) Inventors: Tai-Suk Kim, Seoul (KR); Ki-Seob Hong, Suwon-shi (KR); Jun-Sang Lee, Seoul (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 1111 days.

(21) Appl. No.: 10/341,341

(22) Filed: Jan. 14, 2003

(65) Prior Publication Data
US 2003/0133415 A1    Jul. 17, 2003

(30) Foreign Application Priority Data
Jan. 14, 2002   (KR) ................. 10-2002-0002084

(51) Int. Cl.
*H04B 7/216* (2006.01)
(52) U.S. Cl. ........................... 370/335; 370/342
(58) Field of Classification Search ............ None
See application file for complete search history.

(56) References Cited

U.S. PATENT DOCUMENTS

| 6,434,367 B1 * | 8/2002 | Kumar et al. ............. 455/70 |
| 6,516,196 B1 * | 2/2003 | Chen et al. ............... 455/450 |
| 2002/0154610 A1 * | 10/2002 | Tiedemann et al. ...... 370/329 |

* cited by examiner

*Primary Examiner*—Duc Ho
(74) *Attorney, Agent, or Firm*—Roylance, Abrams, Berdo & Goodman, L.L.P.

(57) ABSTRACT

A system and method for supplemental channel (SCH) assignment control in a Code Division Multiple Access (CDMA) mobile communication system. Upon request of a Mobile Station (MS) for a SCH, a maximum available data rate is determined which is less than a predetermined data threshold. The MS is notified of the determined maximum data rate. Thus, the SCH is assigned to the MS.

26 Claims, 8 Drawing Sheets

SYSTEM AND METHOD OF CONTROLLING ASSIGNMENT OF A CALL ON A REVERSE SUPPLEMENTAL CHANNEL IN A MOBILE COMMUNICATION SYSTEM

PRIORITY

This application claims priority under 35 U.S.C. § 119 to an application entitled "Method of Controlling Assignment of Call on Reverse Supplemental Channel in a Mobile Communication System" filed in the Korean Industrial Property Office on Jan. 14, 2002 and assigned Serial No. 2002-2084, the contents of which are incorporated herein by reference.

BACKGROUND OF THE INVENTION

1. Field of the Invention

The present invention relates in general to a system and method for a call assignment in a mobile communication system, and in particular, to a system and method of controlling an assignment of a reverse call in a mobile communication system.

2. Description of the Related Art

In a mobile communication system, upon a request for the establishment of a call between an MS (Mobile Station) and a BS (Base Station), the call is assigned based on the availability of radio channel resources. Therefore, a call cannot always be assigned. While a dedicated line is assigned to a terminal in wired communications, in wireless communications a call cannot be assigned to an MS when all radio resources available to the BS are in use. Handoff is also a consideration due to the mobility of the MS in the mobile communication system.

Existing $2^{nd}$ Generation (2G) Code Division Multiple Access (CDMA) systems primarily provide voice service. The voice service is provided via FCHs (Fundamental Channels) on forward and reverse links. The Forward link is in the direction from the BS to the MS. The reverse link is in the direction from the MS to the BS.

To satisfy growing user demand for various services, systems that also provide data service have been proposed and standards are being developed to provide global use of the data service. CDMA2000 is one of the proposed systems. It uses the Fundamental Channel (FCH), a Pilot Channel (PCH), and a Supplemental Channel (SCH). The SCH delivers data at a high rate, e.g., Radio Configuration3 (RC3) 9.6, 19.2, 38.4, /76.8, /153.6, and 307.2 Kbps. If a user is assigned an FCH at 9.6 Kbps and an SCH at 153.6 Kbps in RC3, data can be transmitted at a high rate of 163.2 Kbps.

For the CDMA2000 system, transmission power is determined according to the Frame Error Rate (FER) of the FCH. The transmission power of the PICH is determined such that an appropriate FER is maintained for the FCH. The transmission power of the FCH and the SCH is the product of the PICH transmission power and predetermined constants. Hence, the transmission power of an MS is calculated using transmission power=pilot transmission power×(1+ $FCH\_offset+SCH\_offset$)

where the FCH_offset and the SCH_offset are the offsets of the FCH and SCH, respectively with respect to the PICH. The FCH-offset and SCH_offset are constants that vary with channel type, data rate, RC, and coding.

The CDMA mobile communication system basically supports soft handoff and softer handoff. Soft handoff is means communication with a new BS without interrupting communication with an old BS. Softer handoff is handoff between sectors within a cell, with continuity of a call. Softer handoff is simpler to implement than soft handoff. For example, a plurality of channel elements (CEs) are required during a soft handoff, but a single CE is sufficient during a softer handoff.

As stated, CDMA has evolved from the 2G system to the CDMA2000 system with the goal of providing a high-rate data service. Although, the CDMA2000 system initiated the high-rate data service some time ago, little research has been conducted to support efficient provisioning of the high-rate data service. Moreover, studies on the reverse link have been confined to voice service, particularly to call assignment control, power control, soft/softer handoff, and sector capacity analysis. However, as high-rate data transmission as well as voice service is carried out on the reverse link, issues that require consideration have emerged.

First of all, there is a need for a call assignment control technique to ensure quality of the high-rate data service without impairing the quality of the existing voice service. Soft/softer handoff must be performed reliably so that a user can receive the high-rate data service using an FCH and an SCH simultaneously, while handoff. Unlike the voice service, the high-rate data service requires high MS power. Thus, as an MS moves away from a BS, the MS's transmission power may be insufficient. As described, reverse power control is based on a reverse FCH (R-FCH). For high-rate data service, the MS uses a lot of a sector's capacity. Thus, a related power control leads a rapid increase in load and decreases the communication quality of other MSs.

SUMMARY OF THE INVENTION

Therefore, it is an object of the present invention to provide a system and method of controlling the assignment of a call on an R-SCH in a CDMA mobile communication system.

It is another object of the present invention to provide a system and method of controlling the assignment of a handoff call on an R-SCH in a CDMA mobile communication system.

It is a further object of the present invention to provide a system and method of assigning an R-SCH and determining its data rate in a CDMA mobile communication system.

It is still another object of the present invention to provide a system and method of assigning an R-SCH and determining its data rate for a handoff call in a CDMA mobile communication system.

These and other objects can be substantially accomplished by a system and method in which a Base Station (BS) compares a total load of a sector in which a Mobile Station (MS) is located to a predetermined data threshold, upon request of the MS for a reverse-supplemental channel (R-SCH). If the total load of the sector is less than the data threshold, the BS determines a maximum data rate available to the R-SCH that is less than the data threshold and notifies the MS of the determined maximum data rate.

After the R-SCH is assigned to the MS, the BS determines whether the data rate of the R-SCH needs to be changed in every predetermined period. If the data rate of the R-SCH needs to be changed, the BS determines a maximum data rate available to the R-SCH less than the data threshold and notifies the MS of the determined maximum data rate. The BS sets a different available maximum data rate according to the distance of the BS from the MS.

These and other objects can be further accomplished by a system and method in which upon request of a mobile station (MS) for a reverse-supplemental channel (R-SCH) during a handoff, a maximum data rate available to the R-SCH is determined in each of at least one of sectors and base transceiver stations (BTSs) communicating with the MS. The lowest of the maximum data rates from the at least one of sectors and BTSs is selected, and the MS is notified of the data rate of the R-SCH.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Several embodiments of the present invention will be described with reference to the accompanying drawings. Also, a detailed description of known functions and configurations have been omitted for conciseness.

The embodiments of the present invention described herein pertain to control of data call assignment on a reverse-supplemental channel (R-SCH) and limitation of reverse load. In accordance with an embodiment of the present invention, a voice call that is assigned a priority and high-rate data transmission is provided on the reverse link within a threshold below a maximum load for which the voice call can be connected. After the R-SCH is assigned, its data rate is periodically checked to determine whether it needs to be changed. In addition, a method of determining the data rate of the R-SCH during a handoff and setting a different maximum R-SCH data rate according to distance is also provided.

Figure 1:
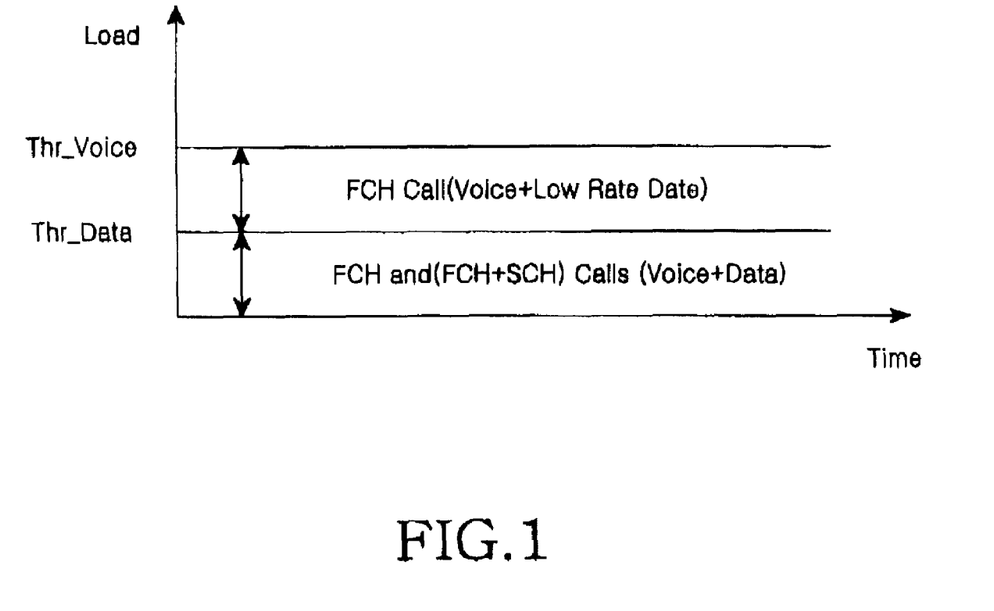
FIG. 1 is a diagram illustrating call assignment control on a reverse link according to a reception load of a Base Station (BS) in accordance with an embodiment of the present invention.

FIG. 1 is diagram illustrating an example of a call assignment control on a reverse link according to the reception load of a Base Station (BS) in accordance with an embodiment of the present invention.

Referring to FIG. 1, there is no load threshold to limit a voice service. If a voice call is connected via an access channel, it is assigned below a maximum reception load of the BS. Thus, the maximum load available to the reverse link is equivalent to a voice threshold, Thr_voice, below which the voice call can be assigned. The total load that a particular Mobile Station (MS) imposes on the reverse link is a ratio of the sum of the transmission power of channels assigned to it, for example, a reverse-pilot channel (R-PICH), a reverse-fundamental channel (R-FCH), and the R-SCH to the total power received from the reverse link, is expressed in Eq. 2 as $$\text{Reverse Load from User} = \frac{\text{reverse transmitted power of user}}{\text{total received power from the reverse link}}$$

In this equation, the total received power from the reverse link includes the user transmitted power which is the sum of the transmission power of all assigned channels, that is, a Pilot Channel (PICH), a Fundamental Channel (FCH) and a Supplemental Channel (SCH). If the SCH is not assigned, the transmission power of the SCH is 0.

A data threshold, Thr_Data, that is lower than the voice threshold, Thr_voice, is set for a data call. If the data threshold, Thr_Data, is exceeded, the BS assigns a voice call and a low-rate data call.

Therefore, if the load of a sector exceeds the voice threshold Thr_Voice, the BS does not assign a call on the reverse link in that sector. If the load is between the voice threshold Thr_Voice and the data threshold Thr_Data, the BS assigns a voice call and a low-rate data call using an FCH only. If the load is below the data threshold Thr_Data, a data and voice calls can be assigned. While the voice threshold Thr_Voice is explicitly represented in FIG. 1 for clarity of description, a voice call is automatically assigned via the access channel. Thus a particular threshold does not exist and the voice call assignment is determined according to the reverse channel's capacity. The load of a sector is the sum of the loads from users in current communication within the sector.

Since voice calls can be assigned within the maximum reverse link capacity, voice call assignment is carried out by calculating the load of a sector rather than by limiting voice calls by applying a particular voice threshold. The data threshold Thr_Data is set to be lower than the maximum load. Thus a high-rate data call assignment control is efficiently performed, ensuring the quality of the existing voice call.

Figure 2A:
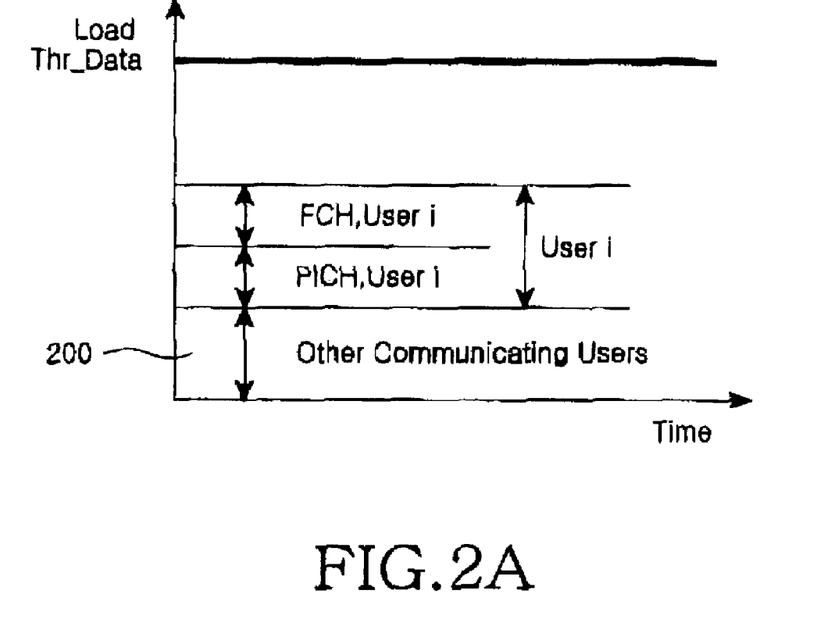
FIGS. 2A and 2B are diagrams illustrating data rate determination in the BS upon request for assignment of an reverse-supplemental channel (R-SCH) in accordance with an embodiment of the present invention.
Figure 2B:
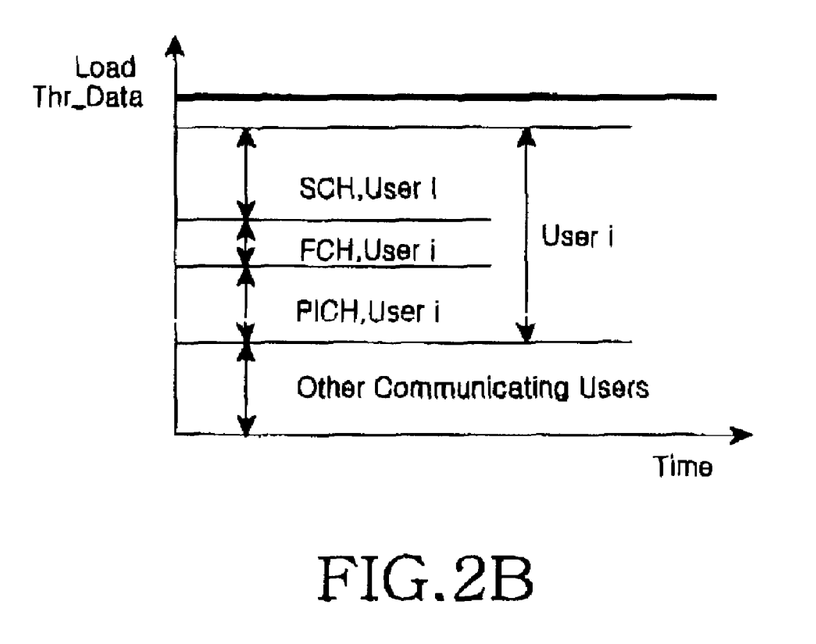

FIGS. 2A and 2B are diagrams illustrating an example of SCH data rate determination in the BS when an R-SCH is assigned in accordance with an embodiment of the present invention.

In general, an R-SCH is assigned to the MS with an R-FCH already established, upon the generation of a large amount of reverse data. Therefore, the R-PICH and the R-FCH have already been established for the MS prior to the R-SCH assignment. When the MS requires the R-SCH, it transmits an Supplemental Channel Request Message (SCRM) to the BS.

The BS then calculates the load from the other MSs in the sector and the load from the MS, that is, the load from the R-PICH and the R-FCH within the sector. The BS calculates an expected total load of the sector when one of the data rates is 9.6, 19.2, 38.4, 76.8, 153.6, or 307.2 Kbps in RC3 is selected for the R-SCH. If the total load of the sector is below the data threshold Thr_Data, a maximum available SCH data rate is selected within the data threshold Thr_Data. The BS then transmits to the MS an Extended Supplemental Channel Assignment Message (ESCAM) containing the determined data rate.

Figure 3:
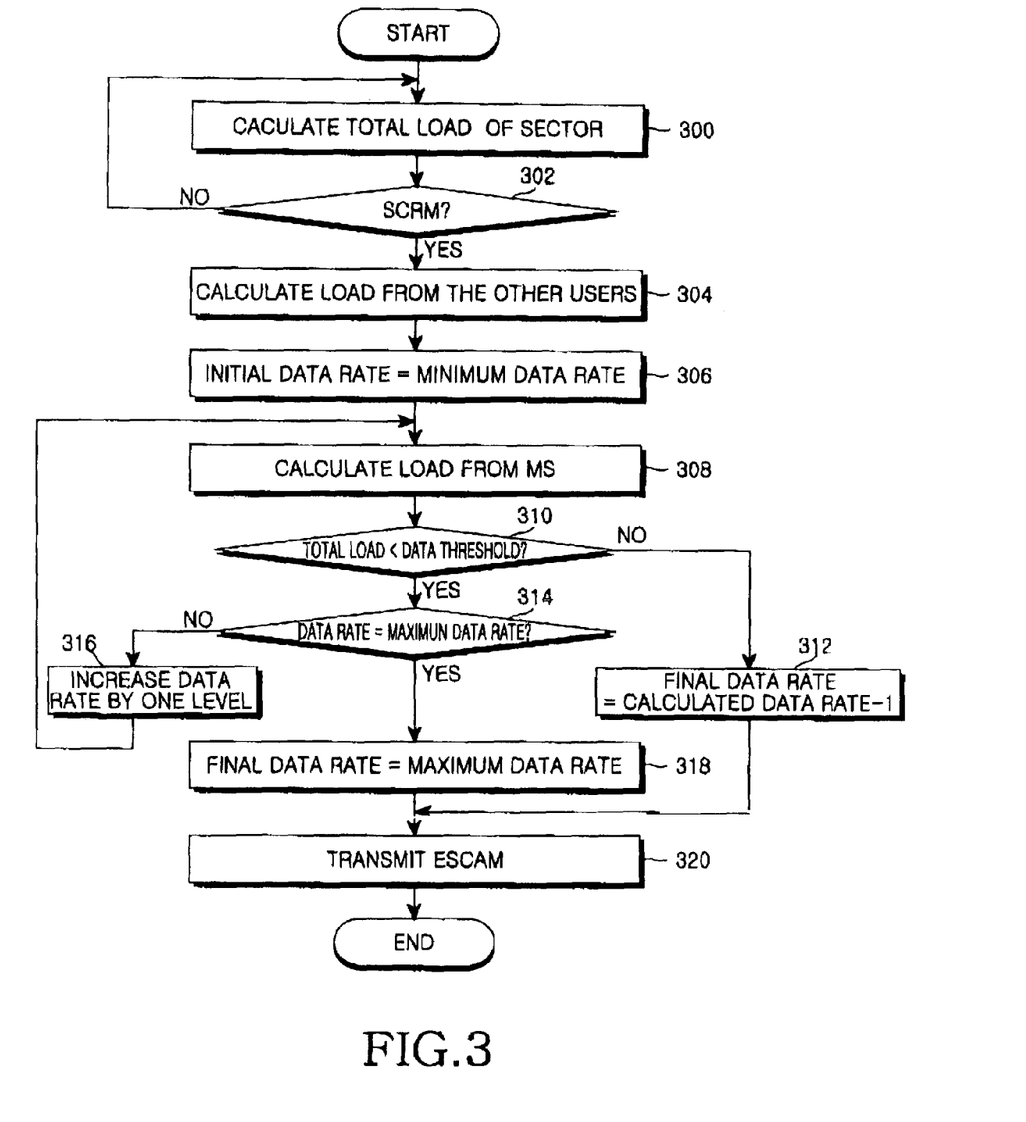
FIG. 3 is a flowchart illustrating an example for determining a data rate in the BS when the R-SCH is assigned in accordance with an embodiment of the present invention.

FIG. 3 is a flowchart illustrating an example of steps for determining the data rate of an R-SCH in a BS when it assigns the R-SCH for reverse high-rate data transmission in accordance with an embodiment of the present invention.

Referring to FIG. 3, the BS calculates the total load that the R-PICHs, R-FCHs and R-SCHs in current use impose on a corresponding sector in step 300 and determines whether an SCRM has been received from an MS within the sector in step 302. Upon receipt of the SCRM, the BS calculates the load from the other MSs except the SCH-requesting MS as indicated by reference numeral 200 in FIG. 2A, in step 304 using the following equation:

Load from the Other Users=Total Load−Load from SCH Requesting User

In step 306, the BS sets a minimum data rate available to the system as an initial SCH data rate for the MS. Then the BS calculates the load from the MS, that is, the load from an already established R-FCH and R-PICH, and the assigned SCH for the MS in step 308.

In step 310, the BS compares the total load of the sector including the load from the SCH at the initial data rate based on the data threshold, Thr_Data. If the total load of the sector is below the data threshold Thr_Data, the BS proceeds to step 314. On the contrary, if the total load of the sector is equal to or above the data threshold Thr_Data, the BS proceeds to step 312. In step 312, the BS decreases the SCH data rate by one level and sets the decreased data rate as a final SCH data rate. If the total load of the sector reflecting the load from the initial SCH data rate is above the data threshold Thr_Data, the SCH is not assigned.

In step 314, the BS compares the SCH data rate with a maximum available data rate. If the SCH data rate is the maximum data rate, the BS proceeds to step 318. Otherwise, the BS increases the SCH data rate by one level in step 316. While the data rate increase is dependent on system-implementation, RC3 is adopted in the embodiment of the present invention. Thus, the initial SCH data rate is 9.6 Kbps and the one-level data rate increase is in the order of 19.2, 38.4, 76.8, 153.6, and 307.2 Kbps. Then the BS calculates the total load of the sector including the load from the SCH at the increased data rate in step 308.

In step 318, the BS sets the maximum data rate as the final SCH data rate. The BS transmits an ESCAM containing information about the final SCH data rate to the MS in step 320. Thus, the SCH is assigned and the SCH data rate is set under the data threshold Thr_Data as illustrated in FIG. 2B. If the final SCH data rate is below its initial data rate, the BS transmits to the MS a message indicating that the SCH cannot be assigned.

Figure 4A:
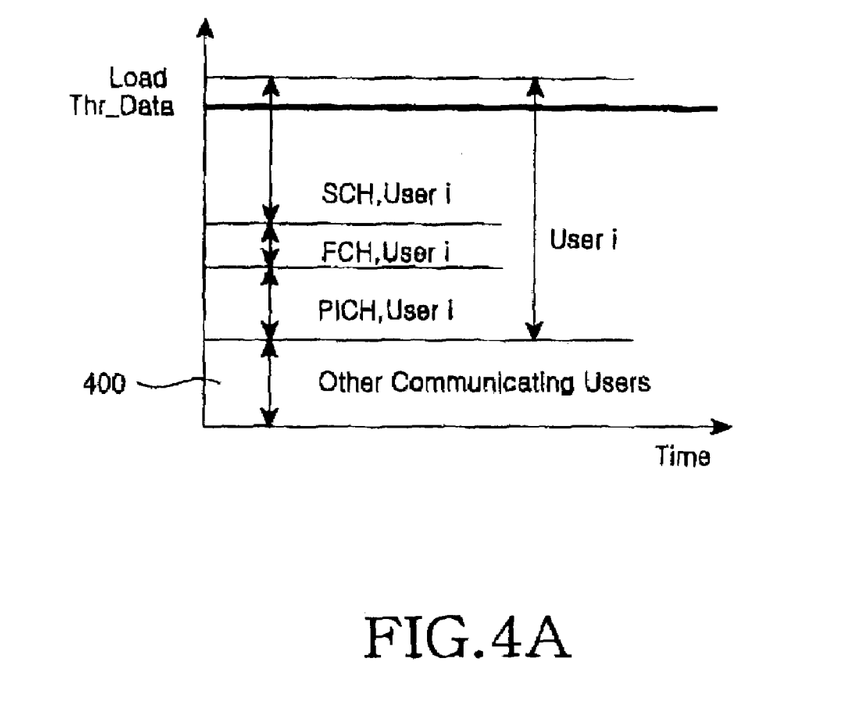
FIGS. 4A and 4B are diagrams illustrating an example of the R-SCH data rate change in the BS in accordance with an embodiment of the present invention.
Figure 4B:
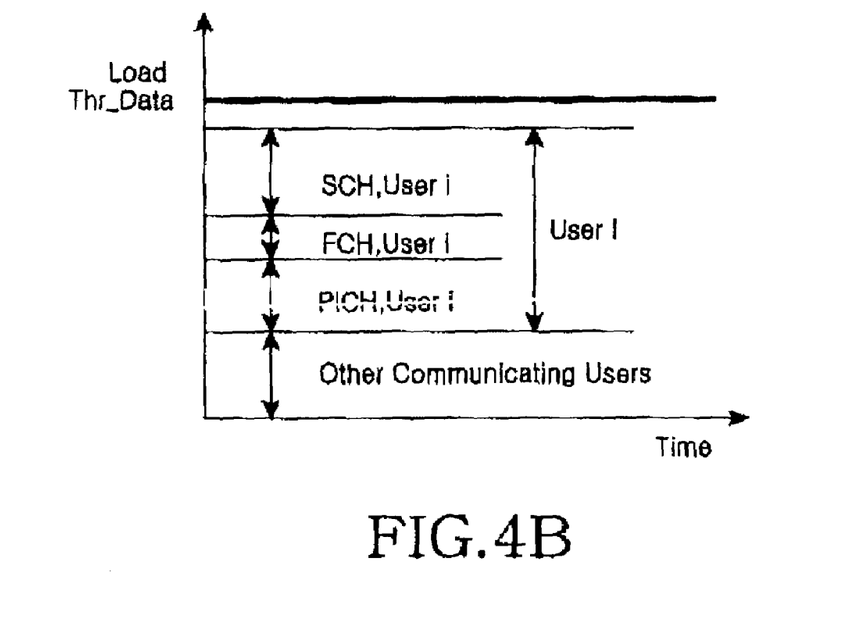

FIGS. 4A and 4B are diagrams illustrating an example of changing the data rate of an R-SCH in accordance with an embodiment of the present invention.

Since the duration of the R-SCH is long, the channel characteristics of a MS that moves while receiving a high-rate data service on the R-SCH, the distance between the MS and its serving BS, and the load from R-FCHs assigned from the BS can be changed. Thus, it can occur that although the total load of the sector does not exceed the data threshold Thr_Data when the SCH is assigned, the total load eventually exceeds the data threshold Thr_Data. Accordingly, the BS needs to determine the total load of the sector and to change the data rate of the R-SCH in every predetermined period. The R-SCH data rate change illustrated in FIGS. 4A and 4B occurs autonomously in the BS.

If it is time to determine the R-SCH data rate of the MS, the BS calculates the load from the other MSs within the sector. When at least two SCH users exist, the BS selects one of the users and excludes the load from the selected SCH user when calculating the load from the other MSs. The SCH user selection is based on QoS (Quality of Service), SCH duration, or SCH data rate. If the total load of the sector is not changed in the SCH data rate, the current SCH data rate is maintained. If the data rate of the SCH can be changed based on the total load of the sector, then the data rate of the SCH is changed. That is, when the total load of the sector exceeds the data threshold Thr_Data as illustrated in FIG. 4A, the SCH data rate is decreased. When the total load of the sector is below the data threshold Thr_Data, the SCH data rate is increased.

Figure 5:
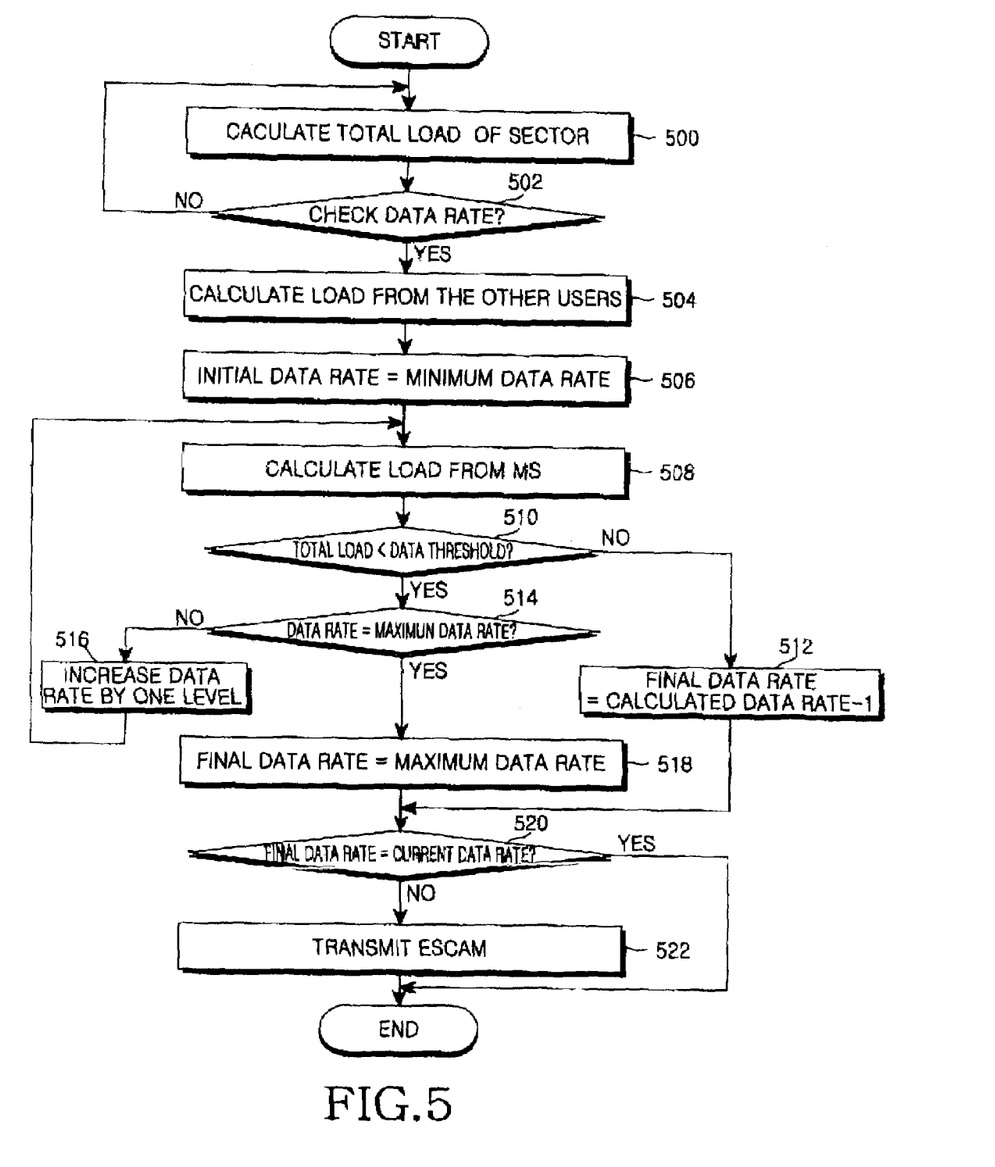
FIG. 5 is a flowchart illustrating an example of steps for changing the data rate of the R-SCH in the BS in accordance with an embodiment of the present invention.

FIG. 5 is a flowchart illustrating an example of steps for changing the data rate of an R-SCH in the BS in accordance with an embodiment of the present invention.

Referring to FIG. 5, the BS calculates the total load that R-FCHs and R-SCHs in current use impose on the sector in step 500 and determines whether a predetermined data rate check time period has expired in step 502. Upon time expiration, the BS calculates the load from the other MSs except the MS using the SCH as indicated by reference numeral 200 in FIG. 2A or reference numeral 400 in FIG. 4A in step 504. If at least two MSs use SCHs, one of the MSs is selected and the load from the other MSs is calculated while the load from the selected MS is excluded from the calculation.

In step 506, the BS sets a minimum data rate available to the system as an initial SCH data rate for the MS. Then the BS calculates the load which includes an already established R-FCH and R-PICH as well as R-SCH to be changed for the MS in step 508.

In step 510, the BS compares the total load of the sector including the load from the SCH at the changed data rate with the data threshold Thr_Data. If the total load of the sector is below the data threshold Thr_Data, the BS proceeds to step 514. If the total load of the sector is equal to or above the data threshold Thr_Data, the BS proceeds to step 512. In step 512, the BS decreases the SCH data rate by one level and sets the decreased data rate as a final SCH data rate. If the total load of the sector which reflect the load from the initial SCH data rate is above the data threshold Thr_Data, the SCH is not assigned.

In step 514, the BS compares the SCH data rate with a maximum available data rate. If the SCH data rate is the maximum data rate, the BS proceeds to step 518. Otherwise, the BS increases the SCH data rate by one level in step 516. Since RC3 is adopted in an embodiment of the present invention, the initial SCH data rate is 9.6 Kbps and the one-level data rate increase is in the order of 19.2, 38.4, 76.8, 153.6, and 307.2 Kbps. As discussed, the data rate increase is dependent on system-implementation. Then the BS calculates the total load of the sector including the load from the SCH at the increased data rate in step 508.

The BS sets the maximum data rate as the final SCH data rate in step 518 and compares the final SCH data rate with the current SCH data rate in step 520. If the two rates are not identical, the operation ends. If the two rates are equal, the BS transmits an ESCAM containing information about the final SCH data rate to the MS in step 522.

When the R-SCH is assigned and its data rate is determined, the Frame Error Rate (FER) of the FCH for the MS should preferably be maintained at a desirable level, for example, at or below 1% of the frame error rate. The signal to interference ratio (SIR) Ec/Nt should also preferably be maintained. The load from the FCH after the SCH assignment can be estimated using the current load measurement from the FCH. Similarly, the load from the MS can also be estimated for each R-SCH data rate by using offsets set for SCH data rate candidates. The R-SCH can be assigned using the estimated load.

Figure 6:
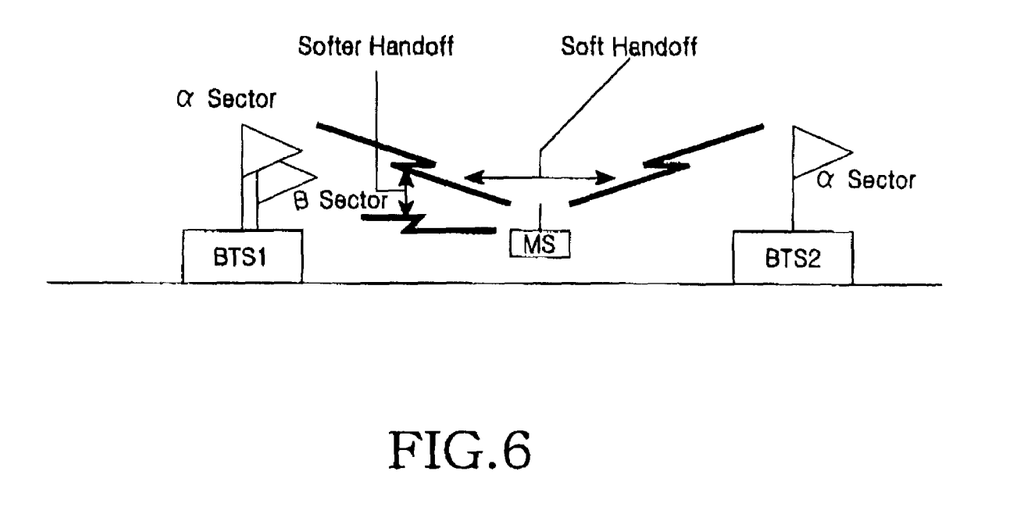
FIG. 6 is a diagram illustrating an example of determining an R-SCH data rate when an R-SCH is assigned or its data rate is changed for a Mobile Station (MS) during a handoff or a BS checks the R-SCH data rate in accordance with an embodiment of the present invention.

FIG. 6 is a diagram illustrating an example of determining the data rate of an R-SCH when an R-SCH is assigned or its data rate changed for an MS during handoff or a BS checks the R-SCH data rate in accordance with an embodiment of the present invention. Hereinafter, the term handoff covers soft handoff and softer handoff.

When the MS requests the R-SCH at handoff, sectors or BSs communicating with the MS calculate an available R-SCH data rate in the above-described method. That is, each BS or each sector calculates the load from the other MSs except the selected MS and sets an available maximum data rate. Then the minimum of the determined data rates is selected as the R-SCH data rate.

In determining the R-SCH data rate, three cases can occur: (1) soft handoff; (2) softer handoff; and (3) concurrent occurrence of soft handoff and softer handoff.

At soft handoff, sectors communicating with the MS in the serving BS calculate an available maximum data rate. The BS then collects the data rates from the sectors and sets the minimum of the data rates as the R-SCH data rate for the MS.

At softer handoff, a BSC collects information on the available maximum data rates from BTSs communicating with the MS and sets the minimum of the data rates as the R-SCH data rate for the MS. Determining the R-SCH data rate can be performed by a source or target BTS instead of the BSC. This process is system-dependent.

When soft handoff and softer handoff occur simultaneously, each BTS at soft handoff collects information on the available maximum data rate from corresponding sectors, selects the minimum of the data rates, and provides the selected data rate to the BSC. The BSC then selects the minimum of the received data rates as the R-SCH data rate for the MS. It should be appreciated by those skilled in the art that determining the data rate can be changed depending on system design.

The reason for selecting the minimum of the maximum data rates available to sectors or to BTSs is that the data rates determined in the sectors or BTSs are maximum data rates would not cause an overload since the MS influences the sectors or BTSs with its output. If a final data rate is higher than the selected minimum of the maximum data rates, the load of a sector or BTS exceeds the data threshold Thr_Data. Consequently, a call is interrupted or the data rate of the SCH is dropped markedly.

Figure 7:
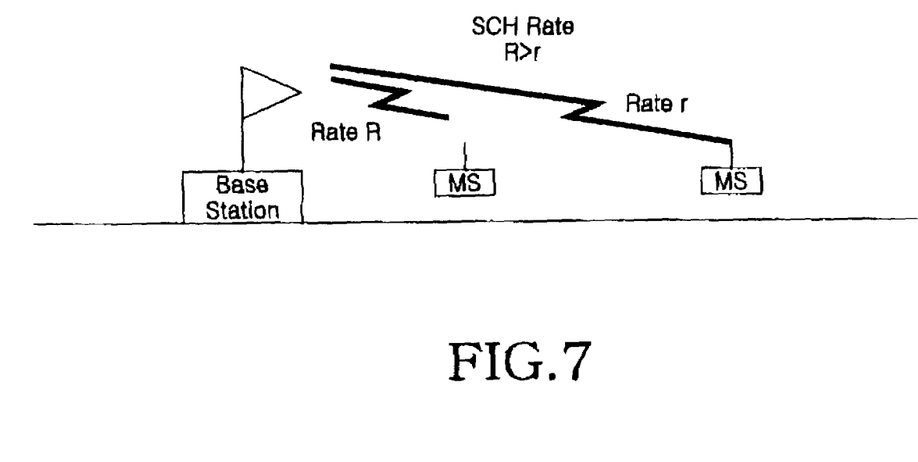
FIG. 7 is a diagram illustrating an example of setting a different maximum data rate for the R-SCH according to a distance between the MS and the BS in accordance with an embodiment of the present invention.

FIG. 7 is a diagram illustrating an example of setting a different maximum data rate for the R-SCH according to the distance between the MS and the BS in accordance with an embodiment of the present invention.

The R-SCH data rate determining methods illustrated in FIGS. 2 to 5 are based on the reception load of the BS and excludes the transmission power of the MS from consideration. In view of the direction of the reverse SCH, it is preferable to consider the MS transmission power. In general, the MS transmission power is in inverse proportion to its distance from the BS or the square of the distance. Since the MS is battery powered, its transmission power is limited. As the MS moves away from the BS, the MS can have reduced transmission power for the BS to maintain its reception load at a determined R-SCH data rate. Therefore, the maximum data rate of the MS can be limited in reverse transmission mode of operation.

In a CDMA2000 1x system, an MS is configured to periodically reports to an active set BS the pilot strength (PS) of the BS by a PMRM (Power Measurement Report Message). The BS then estimates the distance to the MS based on the PMRM. The BS sets a threshold for the forward PS and if the forward PS is below the threshold, the BS lowers a maximum reverse data rate, and considers the distance wide. The threshold can be empirically obtained and different thresholds can be set for distance segments. Therefore, call interruption, a large decrease in data rate, and a increase in error rate can be prevented, which might otherwise be caused by the shortage of the transmission power of the MS when it is remote from the BS.

Figure 8A:
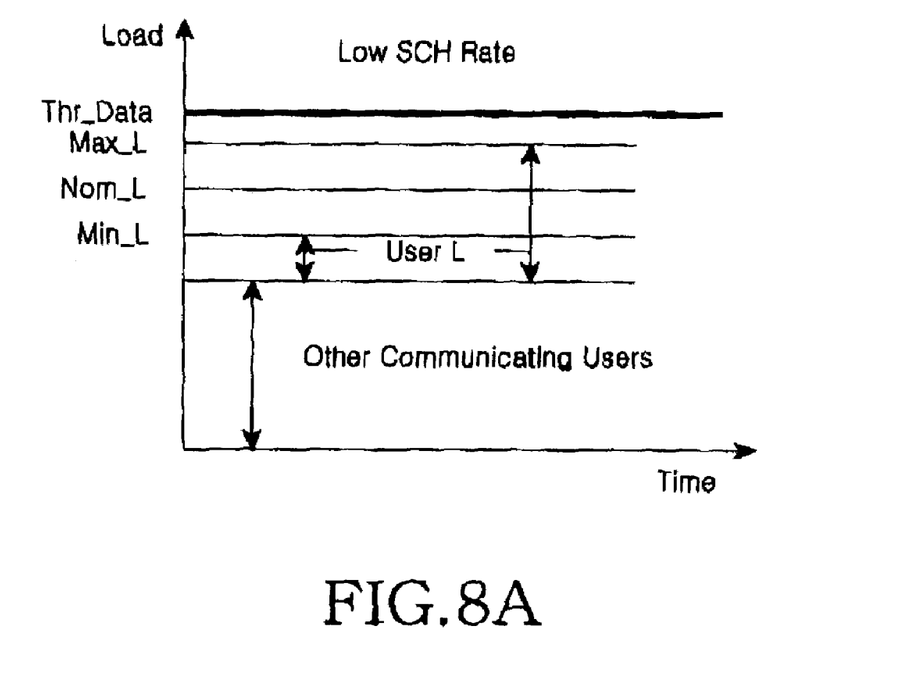
FIGS. 8A and 8B are diagrams illustrating an example of setting a different maximum power control threshold according to the data rate of the R-SCH when the R-SCH is assigned in accordance with an embodiment of the present invention.
Figure 8B:
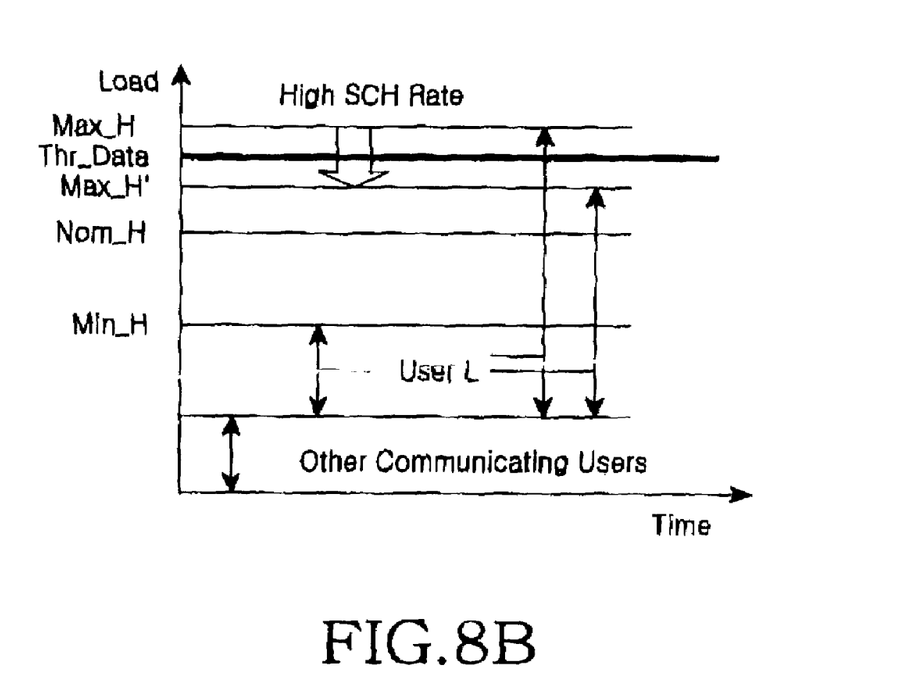

FIGS. 8A and 8B are diagrams illustrating an example of setting a different maximum power control threshold according to the data rate of an R-SCH when the R-SCH is assigned in accordance with an embodiment of the present invention.

As a data rate increases, a wider bandwidth is assigned. From the perspective of the BS's load, power is changed due to various factors in order to maintain a high data rate, resulting in a very large change in load. With reference to FIG. 8, a method of efficiently limiting reverse load that varies with reverse data rate will be described.

FIG. 8A illustrates the variance of reverse load in the case of a low R-SCH rate and FIG. 8B illustrates the variance of reverse load in the case of a high R-SCH rate. If an identical maximum power control threshold is set for two users having different R-SCH data rates, overload can occur as illustrated in FIG. 8B. When the R-SCH is low, power is not changed much in time. However, when the R-SCH is high, power is greatly changed. Therefore, a different maximum power control threshold is set for a different data rate. The maximum power control threshold is empirically obtained. A different maximum power control threshold is set for each R-SCH data rate or for each group of R-SCH data rates.

Consequently, the rapid load increase of the high R-SCH rate user causes overload in the sector, resulting in call interruption or a rapid rate decrease of users including the user himself can be prevented.

In accordance with an embodiment of the present invention, an R-SCH is efficiently assigned and managed without influencing voice call quality, even if handoff occurs. Furthermore, since a different maximum available data rate is set according to distance, the increase of error rate caused by a power shortage in an MS is prevented.

While certain embodiments of the invention have been shown and described with reference to a certain preferred embodiment thereof, it will be understood by those skilled in the art that various changes in form and details may be made therein without departing from the spirit and scope of the invention as defined by the appended claims.

What is claimed is:

1. A method of assigning a call to a mobile station (MS) on a reverse supplemental channel (R-SCH) in a Code Division Multiple Access (CDMA) mobile communication system where a base station (BS) having a cell divided into a plurality of sectors and a plurality of MSs is located in each sector, the method comprising the steps of:
   comparing a total load of a sector in which the MS is located to a predetermined data threshold, upon request of the MS for an R-SCH;
   determining a maximum data rate available to the R-SCH which is less than the data threshold if the total load of the sector is less than the data threshold; and
   notifying the MS of the determined maximum data rate.

2. The method of claim 1, further comprising the steps of:
   determining whether the data rate of the R-SCH is to be changed in every predetermined period after the R-SCH is assigned to the MS;
   determining a maximum data rate available to the R-SCH which is less than the data threshold if the data rate of the R-SCH is to be changed; and
   notifying the MS of the determined maximum data rate.

3. The method of claim 2, wherein the determining step comprises the steps of:
   decreasing the data rate of the R-SCH in order to decrease the total load of the sector to be less than the data threshold, if the total load of the sector is greater than the data threshold; and
   increasing the data rate of the R-SCH to the maximum available data rate which is less than the data threshold if the data rate of the R-SCH is not the maximum data rate and the total load of the sector is less than the data threshold.

4. The method of claim 1, wherein upon request for a voice call, the voice call is assigned within the maximum reverse load of the BS.

5. The method of claim 1, further comprising the steps of:
   calculating a maximum data rate available to the R-SCH in each of at least one of sectors and base transceiver stations (BTSs) communicating with the MS, if the MS handoffs with the R-SCH assigned;
   selecting the lowest of the maximum data rates as the data rate of the R-SCH; and
   notifying the MS of the selected data rate as the data rate of the R-SCH.

6. The method of claim 1, wherein a different available maximum data rate is set according to the distance between the MS and the BS.

7. The method of claim 1, further comprising the steps of:
   calculating an available maximum data rate for the R-SCH in each of BTSs communicating with the MS via a BSC (Base Station Controller), if the MS handoffs between the BTSs with the R-SCH assigned;
   selecting the lowest of the maximum data rates as the data rate of the R-SCH;
   notifying the BTSs of the selected data rate as the data rate of the R-SCH by the BSC; and
   notifying the MS of the selected data rate as the data rate of the R-SCH for each of the BTSs.

8. A method of assigning a call to a mobile station (MS) on a reverse supplemental channel (R-SCH) in a CDMA Code Division Multiple Access (CDMA) mobile communication system where a base station (BS) having a cell divided into a plurality of sectors and a plurality of MSs is located in each of the sectors, the method comprising the steps of:
   determining a maximum data rate available to the R-SCH in each one of the sectors and base transceiver stations (BTSs) communicating with the MS, upon request of the MS for the R-SCH at handoff;
   selecting the lowest of the maximum data rates from the sectors or BTSs; and
   notifying the MS of the selected data rate.

9. The method of claim 8, further comprising the steps of:
   determining whether the data rate of the R-SCH is to be changed in every predetermined period after the R-SCH is assigned to the MS;
   changing the data rate of the R-SCH if the data rate of the R-SCH can be changed; and
   notifying the MS of the changed data rate.

10. The method of claim 9, wherein the determining step comprises the steps of:
    decreasing the data rate of the R-SCH in order to decrease the total load of the sector below a predetermined data threshold, if the total load of the sector is greater than the data threshold; and
    increasing the data rate of the R-SCH to a maximum available data rate which is less than the data threshold if the data rate of the R-SCH is not a maximum data rate and the total load of the sector is less than the data threshold.

11. The method of claim 8, wherein a different maximum data rate is set according to the distance between the MS and the BS.

12. The method of claim 8, further comprising the steps of:
    calculating a maximum data rate available to the R-SCH in each one of the BTSs communicating with the MS via a Base Station Controller (BSC), if the MS handoffs between the BTSs when the R-SCH is assigned;
    calculating maximum data rates available to the R-SCH;
    providing the calculated data rates to the BSC via the BTSs; and
    notifying the MS of a data rate received from the BSC as the data rate of the R-SCH by the BTSs.

13. The method of claim 12, further comprising the step of:
    selecting the lowest of the data rates received from the BTSs; and
    notifying the BTSs of the selected data rate as the data rate of the R-SCH by the BSC.

14. A system for assigning a call on a reverse supplemental channel in a communication system, said system comprising:
    a Mobile Station (MS), a Base Station (BS) having a cell divided into a plurality of sectors, a plurality of MSs disposed within each of said sectors, a Base Transceiver Stations (BTs) and a Base Station Controller;
    said BS is adapted to perform the following operations:
    compare a total load of a sector in which the MS is located to a predetermined data threshold, upon request of the MS for an R-SCH;
    determine a maximum data rate available to the R-SCH which is less than the data threshold if the total load of the sector is less than the data threshold; and
    notify the MS of the determined maximum data rate.

15. The system of claim 14, wherein the BS is further adapted to perform the operations of:
    determine whether the data rate of the R-SCH is to be changed in every predetermined period after the R-SCH is assigned to the MS;
    determine a maximum data rate available to the R-SCH which is less than the data threshold if the data rate of the R-SCH is to be changed; and
    notify the MS of the determined maximum data rate.

16. The system of claim 15, wherein to determine whether the data rate of the R-SCH is to be changed in every predetermined period after the R-SCH is assigned to the MS, the BS is further adapted to perform the operations of:
decrease the data rate of the R-SCH in order to decrease the total load of the sector to be less than the data threshold, if the total load of the sector is greater than the data threshold; and
increase the data rate of the R-SCH to the maximum available data rate which is less than the data threshold if the data rate of the R-SCH is not the maximum data rate and the total load of the sector is less than the data threshold.

17. The system of claim 14, wherein the BS is further adapted to perform the operations of: upon request for a voice call, assign the voice call within the maximum reverse load of the BS.

18. The system of claim 14, wherein the BS is further adapted to perform the operations of:
calculate a maximum data rate available to the R-SCH in each of at least one of the sectors and BTSs communicating with the MS, if the MS handoffs with the R-SCH assigned;
select the lowest of the maximum data rates as the data rate of the R-SCH; and
notify the MS of the selected data rate as the data rate of the R-SCH.

19. The system of claim 14, wherein the BS is further adapted to perform the operation of set a different available maximum data rate according to the distance between the MS and the BS.

20. The system of claim 14, wherein the BS is further adapted to perform the operations of:
calculate an available maximum data rate for the R-SCH in each of the BTSs communicating with the MS via a BSC, if the MS handoffs between the BTSs with the R-SCH assigned;
select the lowest of the maximum data rates as the data rate of the R-SCH;
notify the BTSs of the selected data rate as the data rate of the R-SCH by the BSC; and
notify the MS of the selected data rate as the data rate of the R-SCH for each of the BTSs.

21. A system for assigning a call on a reverse supplemental channel in a communication system, said system comprising:
a Mobile Station (MS), a Base Station (BS) having a cell divided into a plurality of sectors, a plurality of MSs disposed within each of said sectors, a Base Transceiver Stations (BTs) and a Base Station Controller; said BS is adapted to perform the following operations:
determine a maximum data rate available to the R-SCH in each one of the sectors and BTSs communicating with the MS, upon request of the MS for the R-SCH at handoff;
select the lowest of the maximum data rates from the sectors or BTSs; and
notify the MS of the selected data rate.

22. The system of claim 21, wherein the BS is further adapted to perform the operations of:
determine whether the data rate of the R-SCH is to be changed in every predetermined period after the R-SCH is assigned to the MS;
change the data rate of the R-SCH if the data rate of the R-SCH can be changed; and
notify the MS of the changed data rate.

23. The system of claim 22, wherein to determine whether the data rate of the R-SCH is to be changed in every predetermined period after the R-SCH is assigned to the MS the BS is further adapted to perform the operations of:
decrease the data rate of the R-SCH in order to decrease the total load of the sector below a predetermined data threshold, if the total load of the sector is greater than the data threshold; and
increase the data rate of the R-SCH to a maximum available data rate which is less than the data threshold if the data rate of the R-SCH is not a maximum data rate and the total load of the sector is less than the data threshold.

24. The system of claim 21, wherein the BS is further adapted to perform the operation of set a different maximum data rate according to the distance between the MS and the BS.

25. The system of claim 21, wherein the BS is further adapted to perform the operations of:
calculate a maximum data rate available to the R-SCH in each one of the BTSs communicating with the MS via the BSC, if the MS handoffs between the BTSs when the R-SCH is assigned;
calculate maximum data rates available to the R-SCH;
provide the calculated data rates to the BSC via the BTSs; and
notify the MS of a data rate received from the BSC as the data rate of the R-SCH by the BTSs.

26. The system of claim 25, wherein the BS is further adapted to perform the operations of:
select the lowest of the data rates received from the BTSs; and
notify the BTSs of the selected data rate as the data rate of the R-SCH by the BSC.

* * * * *